(12) United States Patent
Chandler et al.

(10) Patent No.: US 10,371,247 B2
(45) Date of Patent: Aug. 6, 2019

(54) TRANSMISSION TUNNEL ENCAPSULATION

(71) Applicant: JAGUAR LAND ROVER LIMITED, Warwickshire (GB)

(72) Inventors: Paul Chandler, Coventry (GB); Gery Fossaert, Coventry (GB)

(73) Assignee: JAGUAR LAND ROVER LIMITED, Whitley, Coventry (GB)

( * ) Notice: Subject to any disclaimer, the term of this patent is extended or adjusted under 35 U.S.C. 154(b) by 0 days.

(21) Appl. No.: 15/972,402

(22) Filed: May 7, 2018

(65) Prior Publication Data

US 2018/0320776 A1    Nov. 8, 2018

(30) Foreign Application Priority Data

May 8, 2017    (GB) .................................. 1707319.8

(51) Int. Cl.
*F16H 57/04*    (2010.01)
*B60K 11/08*    (2006.01)
*B60K 17/00*    (2006.01)

(52) U.S. Cl.
CPC ........ *F16H 57/0415* (2013.01); *B60K 11/085* (2013.01); *B60K 17/00* (2013.01);
(Continued)

(58) Field of Classification Search
CPC ...... F16H 57/027; F16H 57/031; F16H 57/04; F16H 57/0412; F16H 57/0413;
(Continued)

(56) References Cited

U.S. PATENT DOCUMENTS 959,571 A * 5/1910 Mays ..................... B60K 11/08
165/41
4,414,861 A * 11/1983 Witt .................... F16H 57/0427
184/13.1
(Continued)

FOREIGN PATENT DOCUMENTS

DE         2422390 A1      11/1975
DE    102011113621 A1 *    4/2012   ......... F16H 57/0416
(Continued)

OTHER PUBLICATIONS

Machine translation of DE 102016011142 A1 obtained on Jan. 10, 2019.*

(Continued)

*Primary Examiner* — Adam D Rogers
(74) *Attorney, Agent, or Firm* — Carlson, Gaskey & Olds

(57) ABSTRACT

An encapsulation device suitable for encapsulating a transmission component of an engine system that comprises a housing member configured to encapsulate the transmission component and define an air gap in a volume between an outer surface of the transmission component and an inner surface of the encapsulation device in use. The housing member is configured to allow air flow through the air gap during operation of the engine system and to retain a heated air layer around the encapsulated transmission component following engine system shutdown in use. The air gap enables convective cooling of the transmission components during periods when the vehicle is driving and additionally allows heat dissipation to occur when the vehicle engine is switched off.

11 Claims, 10 Drawing Sheets

(52) U.S. Cl.
CPC ..... *F16H 57/0416* (2013.01); *F16H 57/0419* (2013.01); *B60Y 2410/10* (2013.01)

(58) Field of Classification Search
CPC ............. F16H 57/0415; F16H 57/0416; F16H 57/0419; B60K 11/06; B60K 11/08; B60K 11/085; B60K 17/00; B60R 13/08; B60Y 2410/10
See application file for complete search history.

(56) References Cited

U.S. PATENT DOCUMENTS

| | | | | |
|---|---|---|---|---|
| 4,476,820 | A | * | 10/1984 | Nixon .................... B60K 11/00 123/195 C |
| 4,872,502 | A | * | 10/1989 | Holzman ............ F16H 57/0415 165/299 |
| 4,951,527 | A | * | 8/1990 | Klazura ................ F16H 37/042 74/606 R |
| 5,193,415 | A | * | 3/1993 | Massel .................. B60K 17/08 180/346 |
| 2008/0081145 | A1 | | 4/2008 | Schweiggart |
| 2015/0211624 | A1 | * | 7/2015 | Pasaribu ................. F16C 33/78 74/416 |
| 2018/0319353 | A1 | * | 11/2018 | Chandler ............ B60R 13/0838 |

FOREIGN PATENT DOCUMENTS

| | | |
|---|---|---|
| DE | 112013005470 T5 | 9/2015 |
| DE | 102014220119 A1 | 4/2016 |
| DE | 102016011142 A1 * | 3/2017 ............. F16H 57/04 |
| FR | 2432663 A1 * | 2/1980 ........... F16K 15/033 |

OTHER PUBLICATIONS

Machine translation of DE 1102011113621 A1 obtained on Jan. 10, 2019.*
Combined Search and Examination Report under Sections 17 and 18(3) for Application No. GB1707319.8 dated Sep. 29, 2017.

* cited by examiner

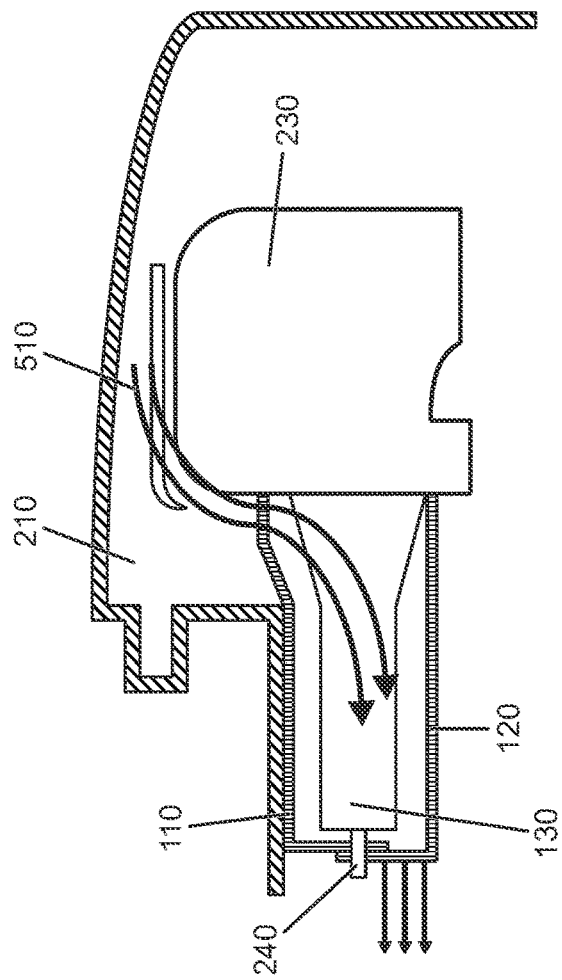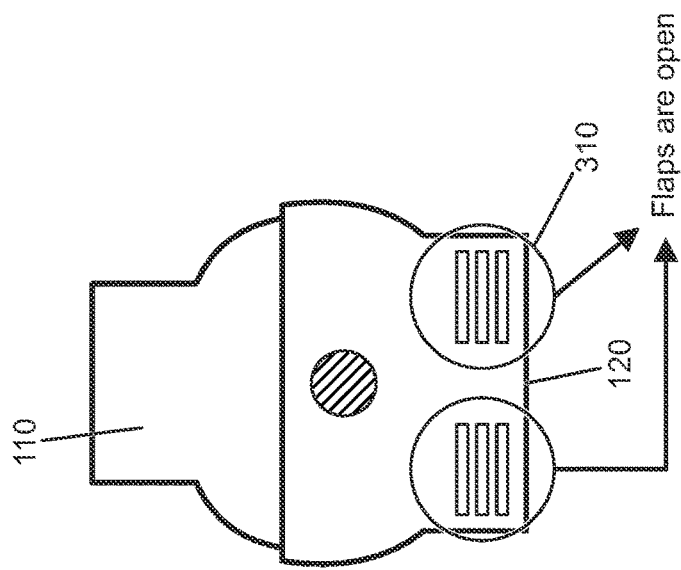
Fig. 5A
Fig. 5B

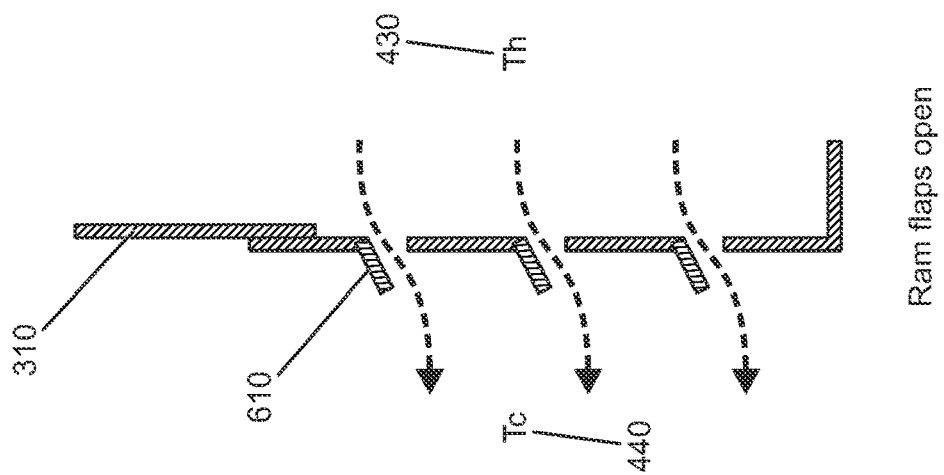
Fig. 6C Ram flaps open
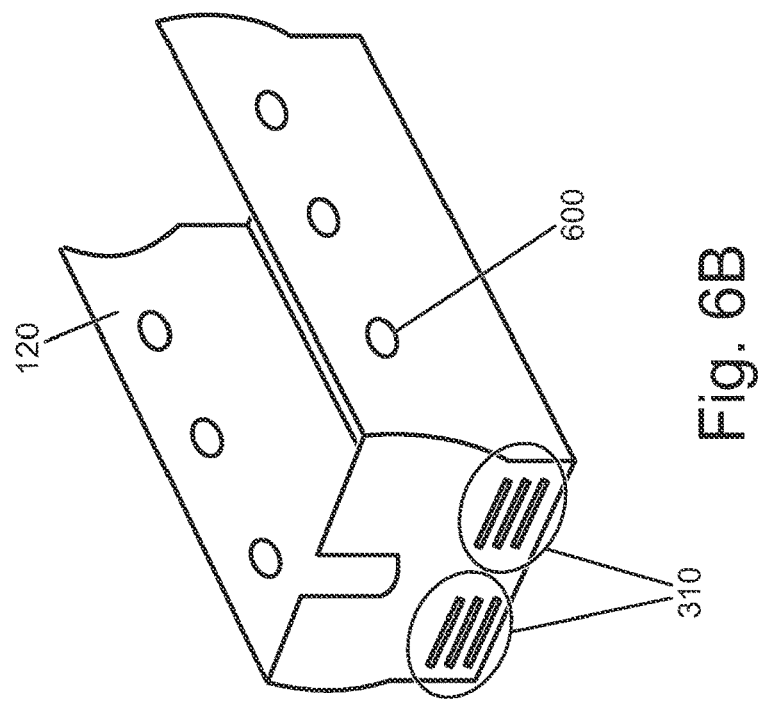
Fig. 6B
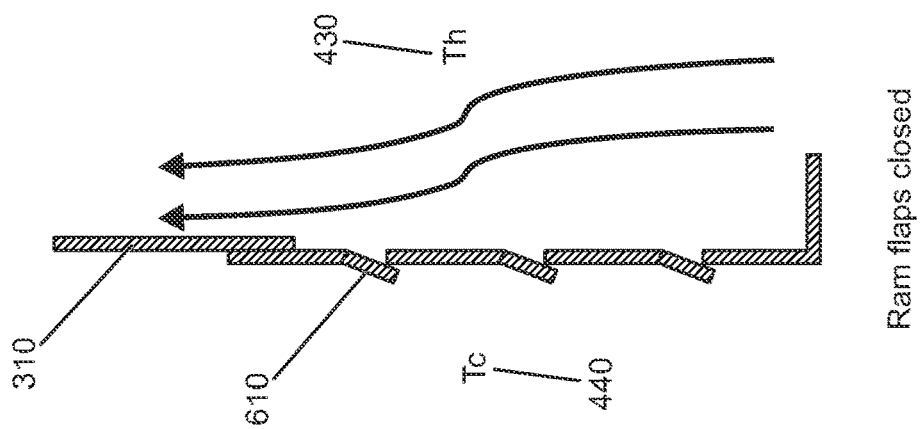
Fig. 6A Ram flaps closed

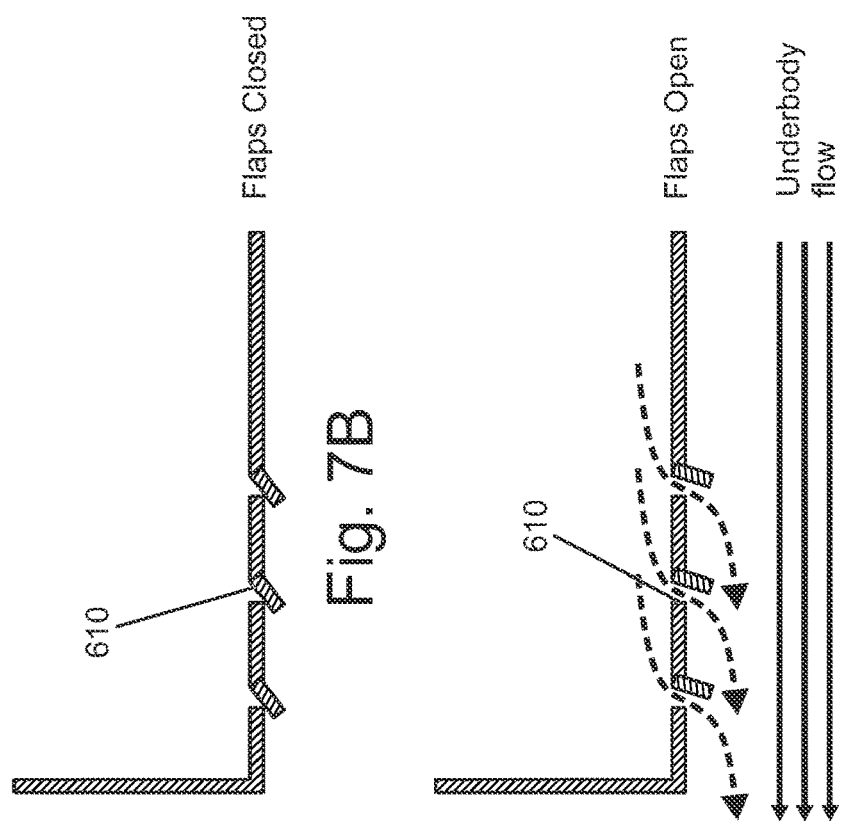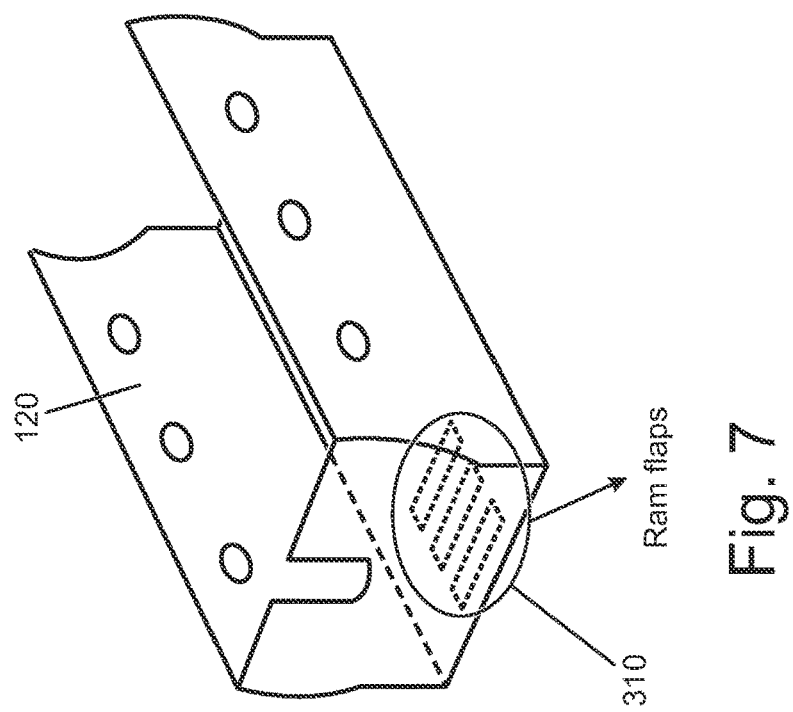

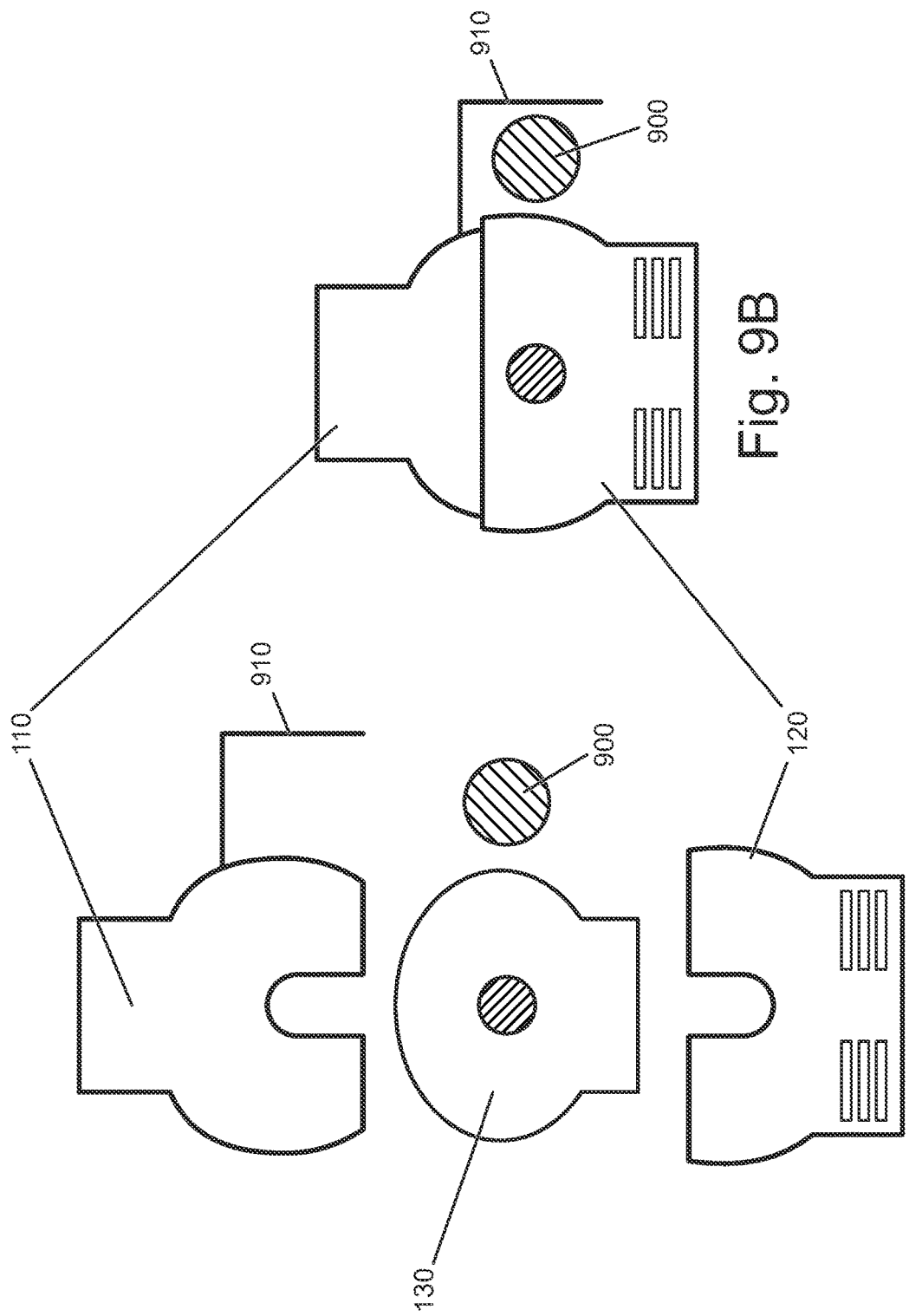

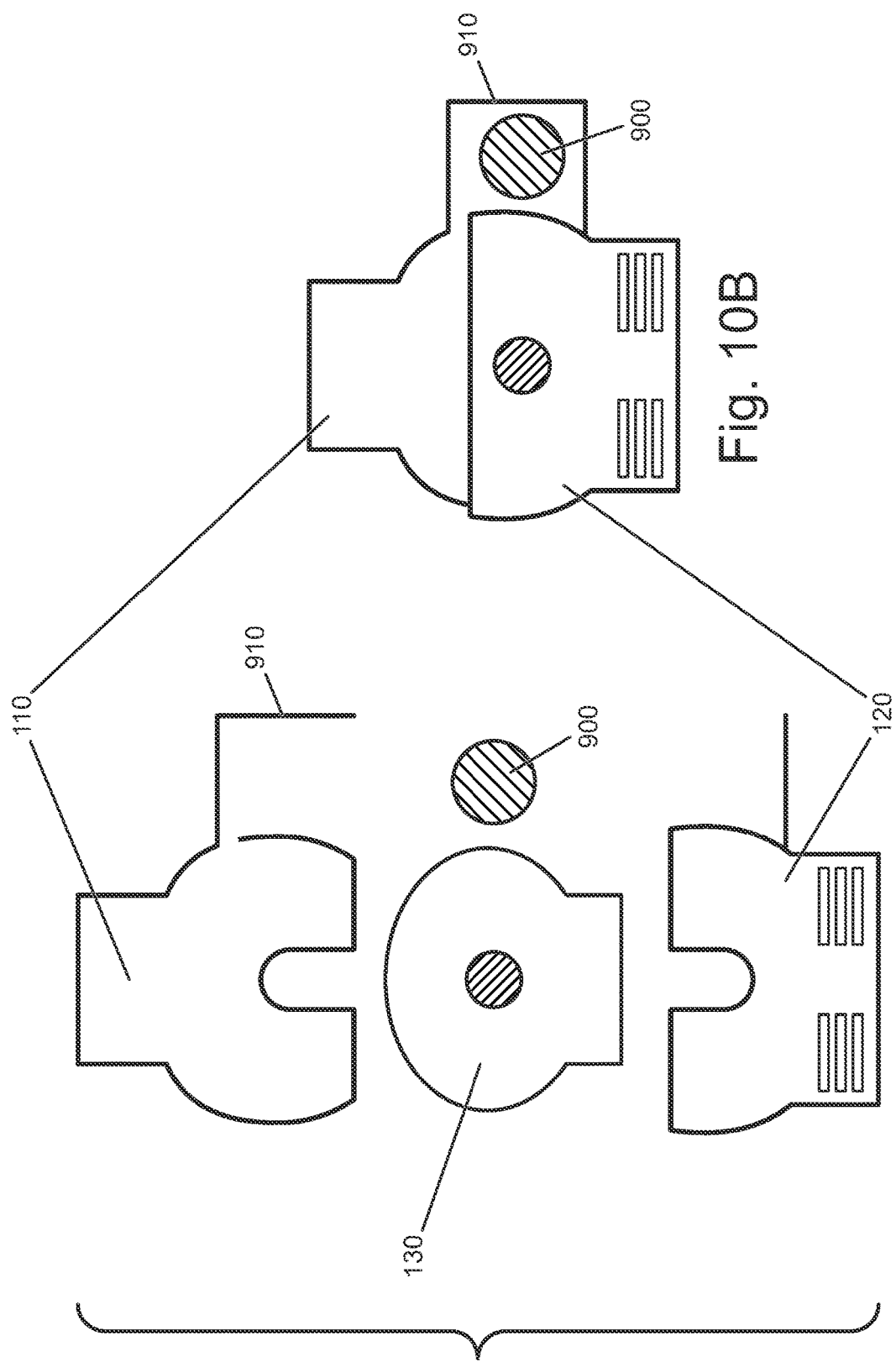

TRANSMISSION TUNNEL ENCAPSULATION

CROSS-REFERENCE TO RELATED APPLICATIONS

This application claims priority to the United Kingdom patent application number GB1707319.8, which was filed May 8, 2017.

TECHNICAL FIELD

The present disclosure relates to a transmission tunnel encapsulation and particularly, but not exclusively, to an encapsulation device suitable for encapsulating a transmission component of an engine system. Aspects of the invention relate to a device and to a vehicle.

BACKGROUND

The encapsulation of components within vehicles is well-known for retaining heat and noise. Absorbing powertrain radiated noise may be achieved via the incorporation of insulating materials applied to the external surface of the transmission to provide an operating temperature that reduces gearbox friction and enables more efficient re-start of the vehicle.

Component encapsulation effectively retains heat within the gearbox structure, gearbox components and its lubrication system to reduce the viscosity and density of gearbox oil for the purpose of reducing friction and improving efficiency.

Current approaches include close-fitted thermal encapsulation and tunnel mounted encapsulation. Close-fitted thermal encapsulation comprises several parts that are fixed to the transmission in a skin-like manner, which means that this type of encapsulation does not let heat flow out and therefore leads to extra heat in the cooling system. Tunnel mounted encapsulation uses a gearbox body mounted cover; consequently the noise radiated from the gearbox is attenuated by the encapsulation and therefore Noise, Vibration & Hardness (NVH) within the vehicle is reduced. However, this type of encapsulation, while providing a benefit through raised oil temperatures and friction reduction, can also provide a challenge for heat rejection, for example, in hot climates. Such situations can also exist with close-fitted encapsulation and manual transmissions where excessive oil temperatures can limit the amount of encapsulation applied. Therefore there is scope for improvement on current approaches.

The present invention has been devised to mitigate or overcome at least some of the above-mentioned problems.

SUMMARY

According to an aspect of the present invention there is provided an encapsulation device suitable for encapsulating a transmission component of an engine system comprising a housing member configured to encapsulate the transmission component and define an air gap in a volume between an outer surface of the transmission component and an inner surface of the encapsulation device. The housing member is configured to allow air flow through the air gap during operation of the engine system and to retain a heated air layer around the encapsulated transmission component following engine system shutdown.

Embodiments of the present invention provide an encapsulation device having a housing member which is configured to surround vehicle transmission components such that an air gap is defined between the housing member and the transmission components. This air gap enables convective cooling of the transmission components during periods when the vehicle is driving and additionally allows heat dissipation to occur when the vehicle engine is switched off.

The housing member may comprise air outlet ducts that could be pressure actuated or actuated by a motor.

The encapsulation device may be conveniently applied to vehicles with manual transmissions and vehicles operating in hot climates.

The housing member may comprise a single component which is fitted to the transmission component, e.g. during vehicle build. Alternatively the housing member may comprise first and second portions which conveniently may be fitted and removed during the life of the vehicle. In the latter case, the first portion may be disposed above the second portion or the first portion may be arranged to rest on the transmission component in use where the second portion may be removeably attached to the first portion.

The housing member may comprise a substantially vertical panel.

The air outlet ducts may be located on the substantially vertical panel or on a top panel of the first portion or on a bottom panel of the second portion.

The housing member may be configured to additionally encapsulate an exhaust and/or after-treatment component within the volume between the outer surface of the transmission component and the inner surface of the encapsulation device.

The housing member may comprise an outer surface, the outer surface being arranged to support an exhaust encapsulation housing for encapsulating an exhaust and/or after-treatment component.

The housing member may comprise a heat reflective coating, e.g. an aluminium coating, to protect the encapsulation from heat and to ensure sufficient durability of the encapsulation.

Embodiments of the present invention also provide a vehicle comprising an encapsulation device as described above that may be arranged to encapsulate the gearbox/transmission oil pan.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which like components are assigned like numerals and in which:

FIGS. 5A and 5B show the transmission tunnel encapsulation of FIG. 2 and FIG. 3, where the air flow during vehicle operation is illustrated and the air outlet ducts are open;

FIGS. 6A-6C show the second portion of the transmission tunnel encapsulation in FIG. 3, to illustrate an open configuration and a closed configuration of the air outlet ducts;

FIGS. 7A-7C show a transmission tunnel encapsulation in accordance with an alternative embodiment of the invention, where the air outlet ducts are located at the bottom panel of the second portion of the encapsulation;

FIGS. 9A and 9B show a transmission tunnel encapsulation in accordance with a further alternative embodiment of the invention, which includes an encapsulation of an exhaust and/or after-treatment including a convection air gap; and FIGS. 10A and 10B show a transmission tunnel encapsulation in accordance with a further alternative embodiment of the invention, which includes an exhaust and/or after-treatment encapsulation within the first portion of the transmission tunnel encapsulation.

DETAILED DESCRIPTION

A transmission tunnel encapsulation (100) in accordance with an embodiment of the invention is shown in FIGS. 1 to 6.

Figure 1B:
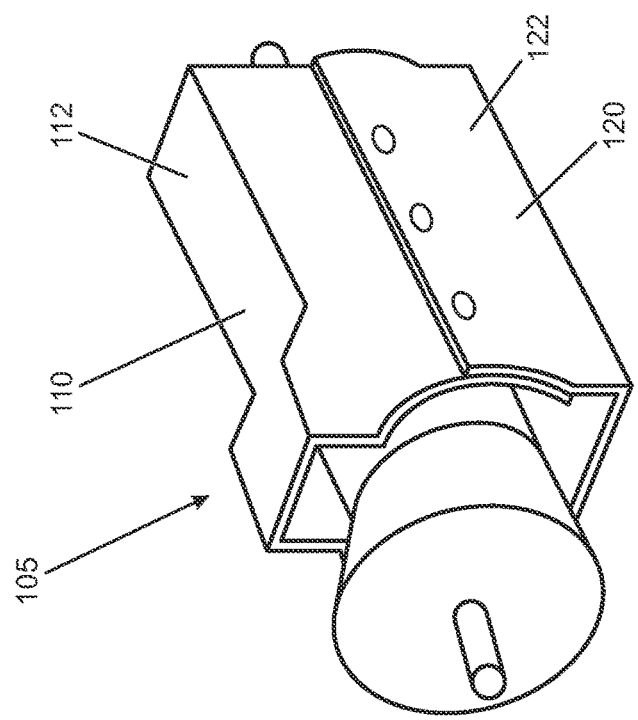
FIGS. 1A and 1B show a transmission tunnel encapsulation, in accordance with an embodiment of the invention.
Figure 1A:
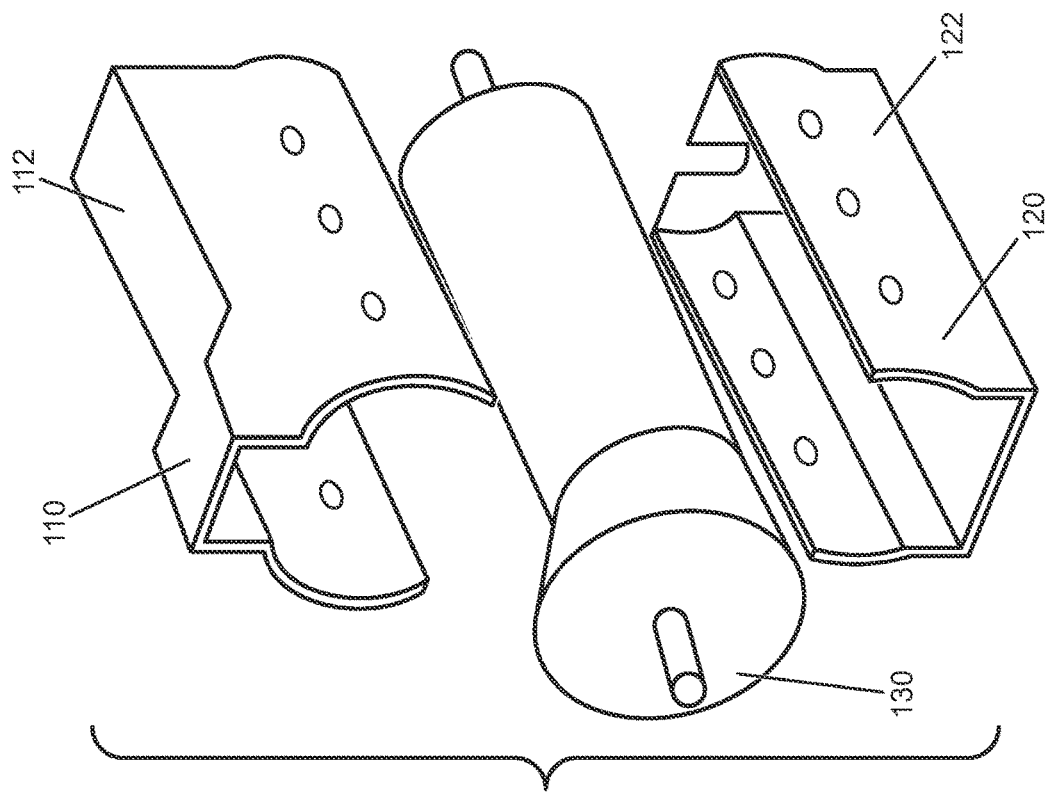

FIG. 1A is an exploded view and FIG. 1B shows the encapsulation in an assembled state surrounding a gearbox (130). The encapsulation (100) comprises a housing member (105) having a first portion (110) and a second portion (120) where there is an overlap between the two. The first portion (110) comprises a top panel (112) and two side panels, (114) and (116) (not shown in FIG. 1, shown in FIG. 3C), which extend on either side of the gearbox (130). The second portion (120) comprises a bottom panel (122) and two side panels, (124) and (126) (not shown in FIG. 1, shown in FIG. 3C), which extend on either side of the gearbox (130). The two portions of the encapsulation, (110) and (120) overlap with each other to surround the gearbox (130). The encapsulation is typically composed of materials with thermally insulating properties and/or acoustic insulating properties, for example, polyurethane foams, glass fibre, natural fibres or aerogel. The materials used for the encapsulation typically have low conductivity (<1 W/mK).

Figure 2:
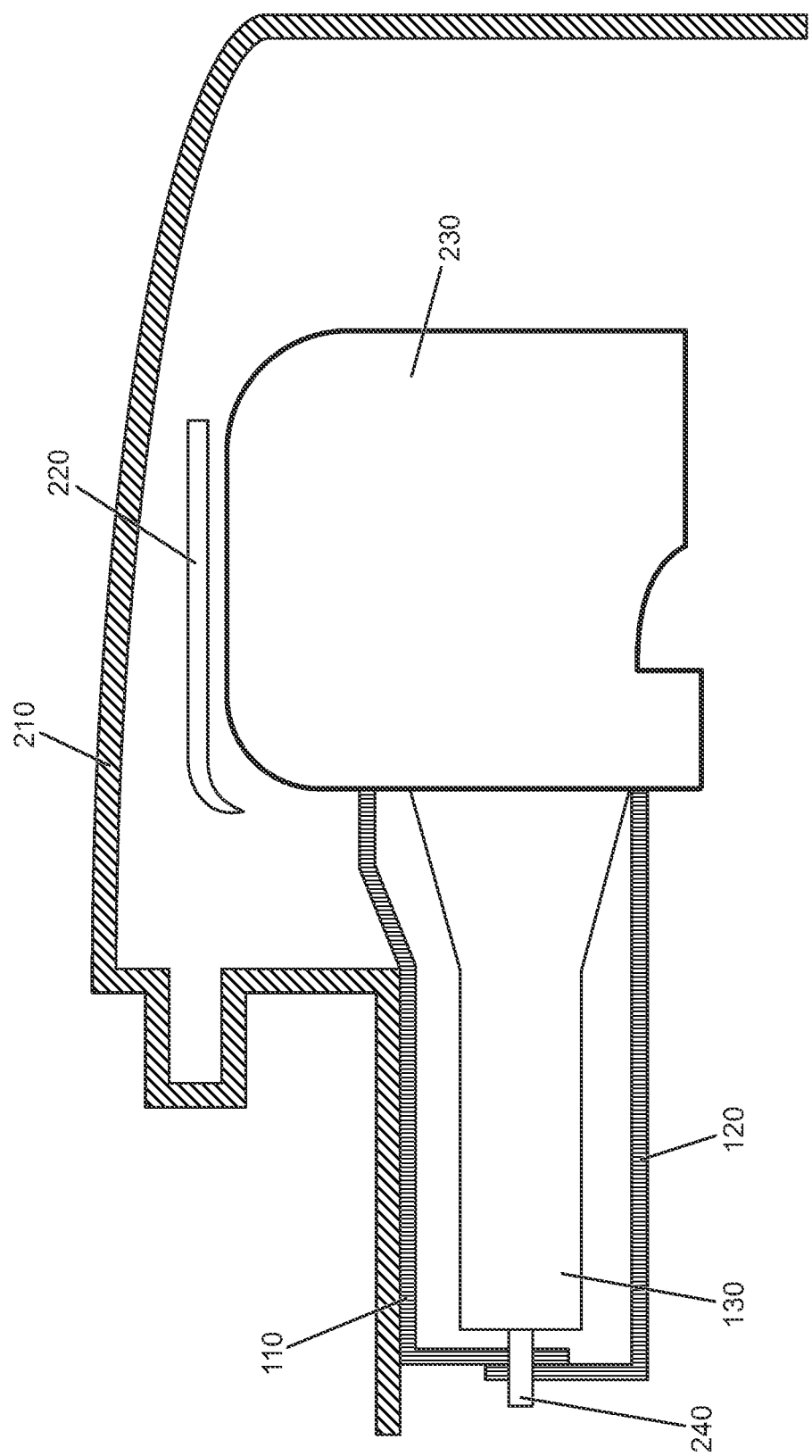
FIG. 2 shows a side view of the transmission tunnel encapsulation of FIG. 1, where the encapsulation is fully integrated within a vehicle transmission tunnel.
Figure 3:
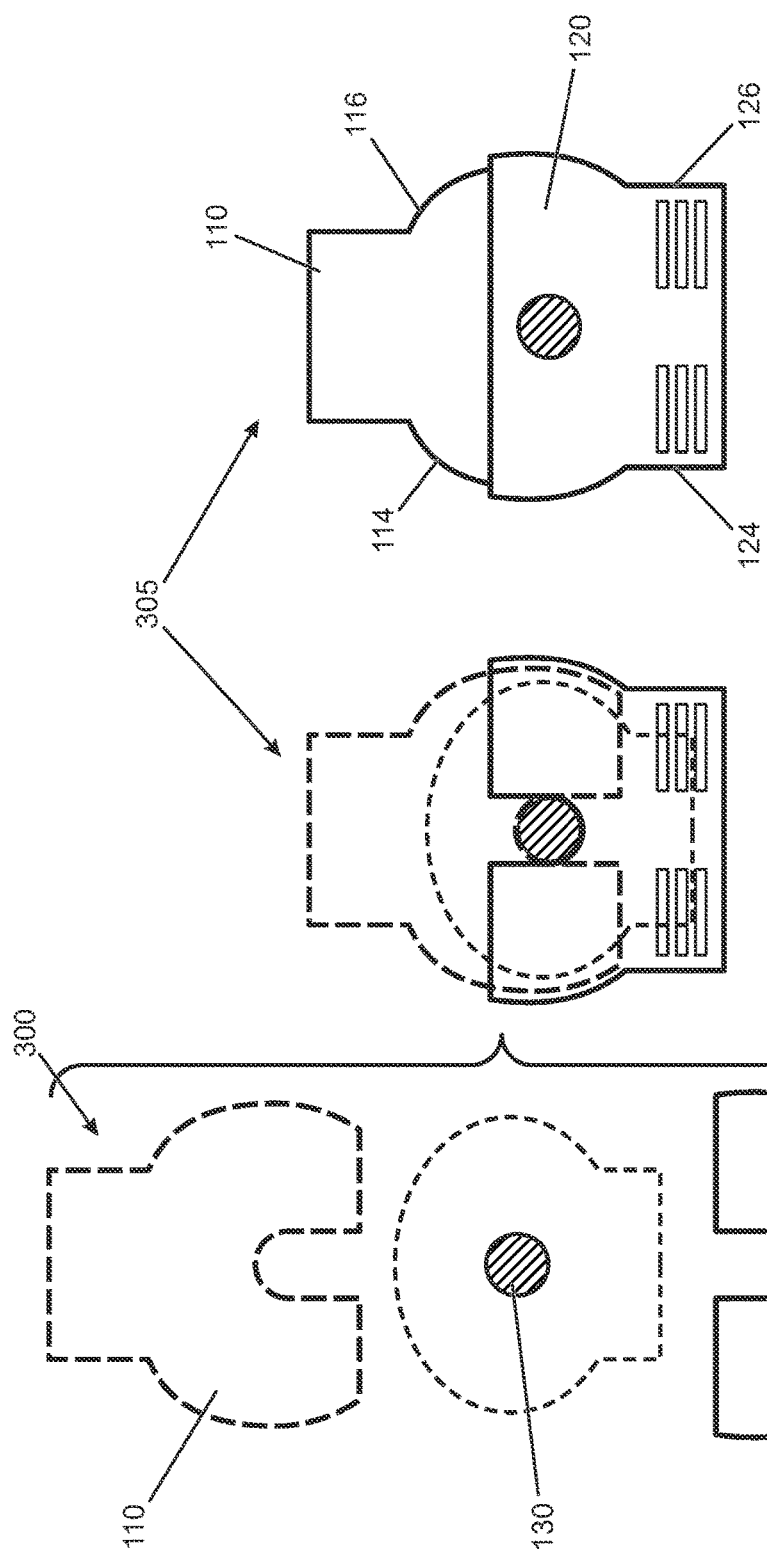
FIGS. 3A-3C show a rear view of the transmission tunnel encapsulation of FIG. 1, where air outlet ducts are located on the second portion of the encapsulation.

In FIG. 2, a side view of the transmission tunnel encapsulation (100) of FIG. 1 is shown integrated in the vehicle tunnel. An engine (230) and engine styling cover (220) are shown within a vehicle body (210). The gearbox (130) is situated adjacent to the engine (230) wherein a drive shaft (240) protrudes from the gearbox (130), in the opposite direction to the engine (230). The first portion (110) of the encapsulation (100) is fixed to the second portion (120) and the resulting encapsulation surrounds the gearbox (130).

In FIGS. 3A-3C, a rear view of the transmission tunnel encapsulation (100) of FIG. 1 is shown surrounding the gearbox (130). As depicted in FIG. 3A, which is an exploded rear view (300) of the encapsulation, two sets of air outlet ducts (310) are located on the second portion (120) of the encapsulation (100), wherein the vents of the air outlet ducts (310) are arranged horizontally. In FIG. 3C, an assembled rear view (305) of the encapsulation is shown in which the first portion (110) and the second portion (120) of the encapsulation surrounding the gearbox can be seen.

Figure 4:
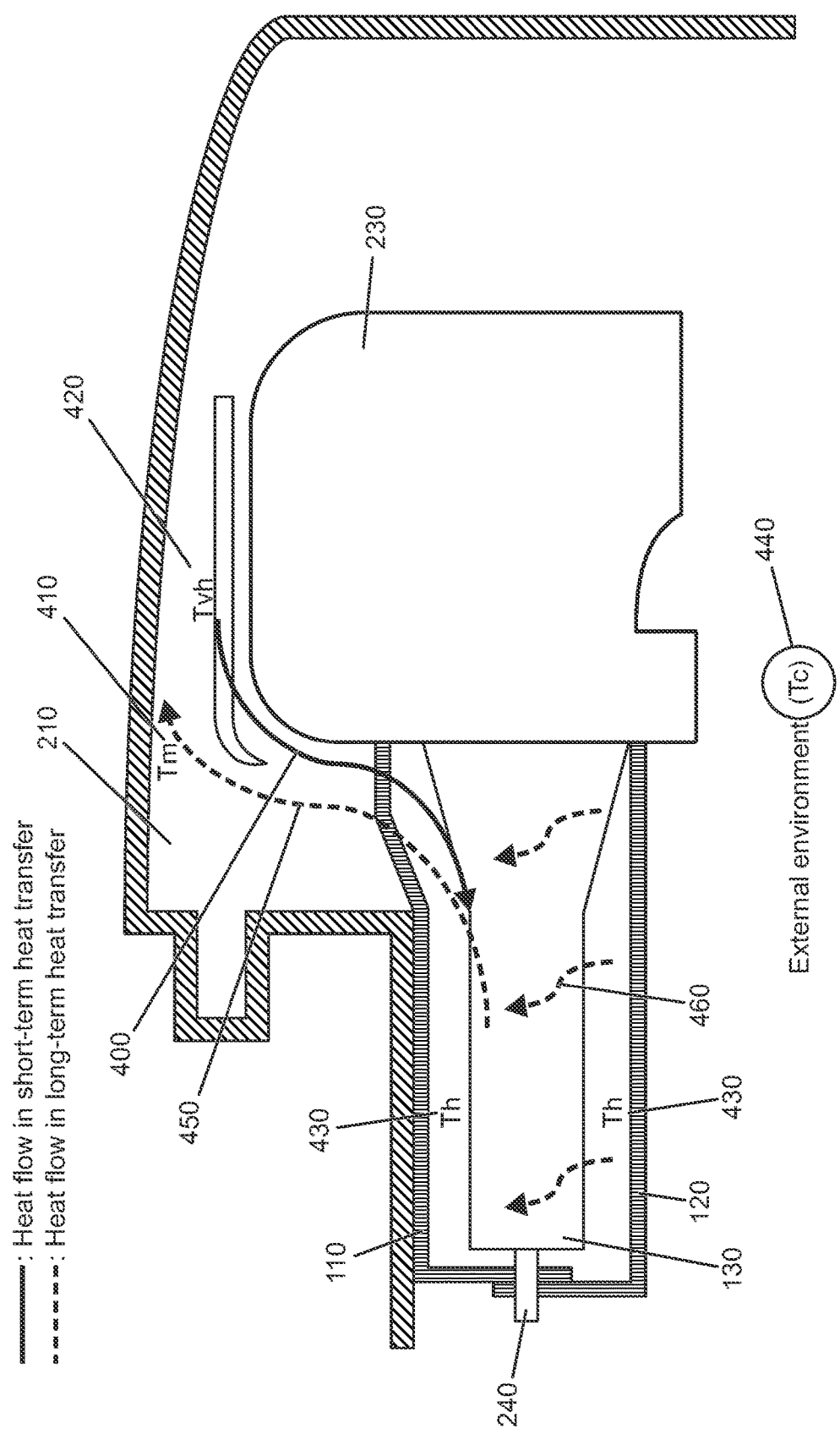
FIG. 4 shows the transmission tunnel encapsulation of FIG. 2, where the heat flow in the short-term and in the long-term, after engine shut-down, is indicated.

FIG. 4 shows the same side view of the engine, gearbox and tunnel encapsulation of FIG. 2 but with the addition of the heat flow that occurs shortly after engine shut-down and the heat flow that occurs in the long-term after engine shut-down. The solid arrow (400) shows short term heat flow. For example, shortly after engine shut-down, the air temperature (420) within the engine bay is substantially higher than the air temperature (430) of the cavity within the encapsulation. This temperature imbalance means that heat will flow from the engine bay to the gearbox tunnel (130) and consequently be trapped in the encapsulation (100).

The dashed arrow (450) shows the flow of heat on a longer time scale after engine shut-down. In this case, heat escapes from the engine compartment, through the bonnet, wheel arches and front grill (not shown in FIG. 4) causing a drop in engine bay air temperature (410), meaning the air temperature (430) in the gearbox tunnel is higher than the engine bay temperature. This temperature imbalance causes heat to flow from the gearbox tunnel (130) to the engine bay (210) in the long term. The three dashed arrows (460) located within the encapsulation illustrate the general upflow of air as hot air rises. Heat flow to the engine bay (210) in turn reduces heat exchange between the engine (230) components and the surrounding air in the engine bay (210), which consequently increases engine heat retention.

In FIG. 5A a side view and in FIG. 5B a rear view of the transmission tunnel encapsulation (100) surrounding the gearbox (130) is shown during vehicle operation. In the side view of FIG. 5A, the solid arrows (510) depict air flow from the engine bay through the transmission tunnel and then through the open air outlet ducts which are forced open by the pressure of the air flow. This air flow removes generated heat from the gearbox (130) to ensure oil and component gearbox temperatures are maintained within acceptable limits. The rear view illustrates the open air outlet ducts (310) during vehicle operation.

In FIG. 6B, the lower portion (120) of the transmission tunnel encapsulation (100) is shown in more detail to illustrate a closed configuration and an open configuration of the air outlet ducts (310). The closed configuration that occurs when the vehicle is shut down is shown in FIG. 6A. In this case, the air flow through the transmission tunnel encapsulation and the static pressure on the transmission tunnel encapsulation are reduced in comparison to during vehicle operation, and so the flaps/vents (610) of the air outlet ducts (310) are closed, restricting the leakage of flow to the external environment. This allows hot air to remain within the transmission tunnel encapsulation which provides an insulating hot air layer onto the gearbox external surfaces. The open configuration that occurs when the vehicle is in operation is shown in FIG. 6C. In this case, the air flow passes from the engine bay through the transmission tunnel encapsulation creating a pressure difference across the air outlet ducts and consequently opening the vents. Therefore the vents (610) of the air outlet ducts (310) are open when the vehicle is in operation allowing air flow to exit the transmission tunnel encapsulation. The air flow passing the gearbox removes the generated heat from the gearbox. The second portion (120) of the encapsulation (100) is provided with fixings (600) along the two side panels, (124) and (126), as shown in FIG. 6B, enabling the encapsulation to be mounted and disassembled with ease.

In another embodiment, as shown in FIGS. 7A-7C, the air outlet ducts (310) may be located on the bottom panel (122) of the second portion (120) of the encapsulation (100). It is noted that in addition to allowing air flow out of the encapsulation tunnel, the configuration of the air outlet duct in FIG. 7 allows water to be evacuated effectively through the vents on the bottom panel. It is noted that a tunnel encapsulation may be provided with both the air outlet ducts of FIG. 6 and the air outlet ducts of FIG. 7.

Figure 8B:
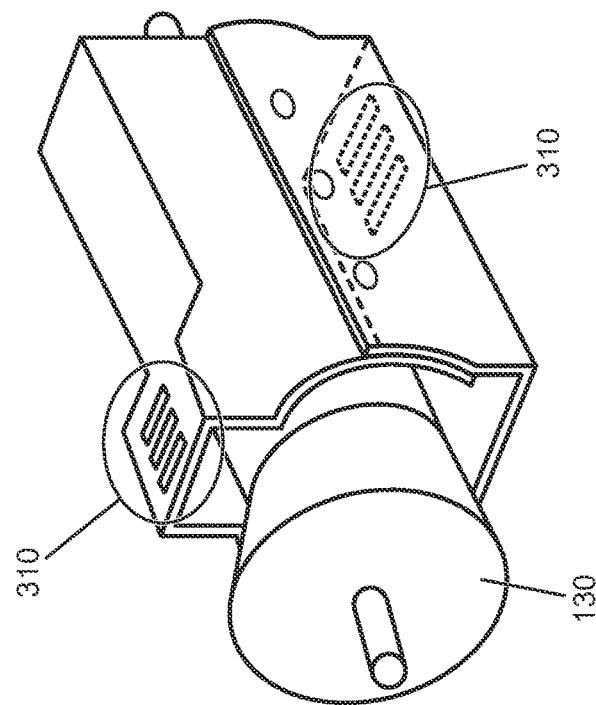
FIGS. 8A and 8B show a transmission tunnel encapsulation in accordance with a further alternative embodiment of the invention, comprising temperature-controlled vents that are dependent on the transmission oil temperature as well as vehicle operation.
Figure 8A:
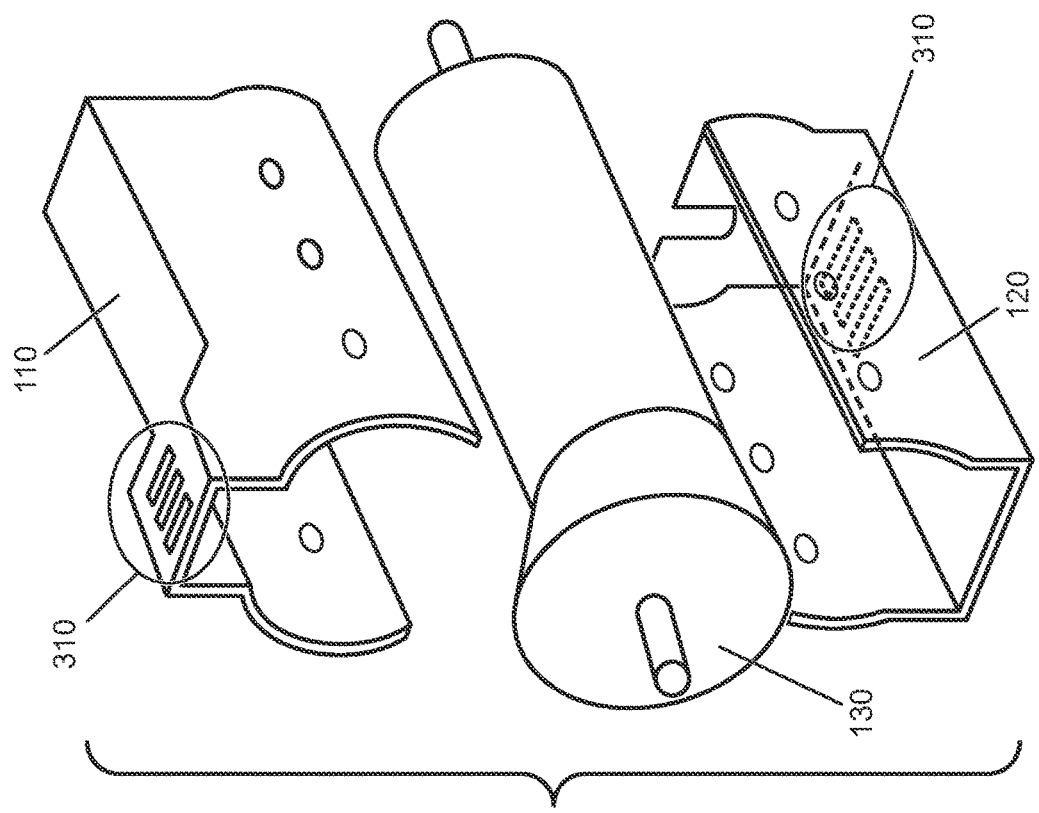

In another embodiment, as shown in FIGS. 8A and 8B, the transmission tunnel encapsulation (100) has temperature-controlled vents that are dependent on the transmission oil temperature as well as vehicle operation. The vents (610) in this embodiment of the invention can be implemented with any arrangement of the vents in the housing. In this example embodiment, the vents (610) are located on the top panel of the first portion (110) of the encapsulation (100) and on the bottom panel (122) of the second portion (120) of the encapsulation (100). When the vehicle is shut down, the vents are closed in order to maintain the temperature within the transmission tunnel encapsulation. During warm-up, the closed vents mean that the surrounding air heats up and induces faster transmission warm-up, consequently reducing the time required for warm-up. Once the oil reaches its predetermined operating temperature, the vents open and allow the cooling air flow to enter. The temperature controlled vents could be actuated by a motor and controller linked to the vehicle power-train module (PCM) to ensure optimum heat management under all conditions and driving styles.

In another embodiment, as shown in FIGS. 9A and 9B, an exhaust and/or after-treatment encapsulation (910) is located on and attached to the first portion (110) of the transmission tunnel encapsulation (100) and covers the top of the exhaust (900) and/or after-treatment. The exhaust and/or after-treatment encapsulation (910) is made from a material that is resistant to high temperatures as well as reflective (for example, heat shields). Consequently, the radiation heat of the exhaust is reflected from the transmission tunnel encapsulation. Further, convective heat of the exhaust would be collected and allowed to flow within the transmission tunnel encapsulation, enabling improved heat retention after vehicle shut-down. The properties of the materials also protect the transmission tunnel from convective and radiative heat sources.

In another embodiment, as shown in FIGS. 10A and 10B, an exhaust and/or after-treatment encapsulation (910) is located within and attached to the first portion (110) of the transmission tunnel encapsulation (100). This exhaust and/or after-treatment encapsulation (910) is made from a material that is resistant to high temperatures as well as reflective (for example, heat shields). Consequently, the radiation heat of the exhaust is reflected from the transmission tunnel encapsulation. Further, convective heat of the exhaust would be collected and allowed to flow within the transmission tunnel encapsulation, enabling improved heat retention after vehicle shut-down. The properties of the materials also protect the transmission tunnel from convective and radiative heat sources.

Many modifications may be made to the above examples without departing from the scope of the present invention as defined in the accompanying claims. In particular it is noted that none of the embodiments are mutually exclusive and the various embodiments of the air outlet ducts and exhaust and/or after treatment encapsulation may be combined together in any suitable combination. As an example, the alternative embodiment in FIG. 8, which shows the vents located on the top panel of the first portion and the bottom panel of the second portion, could be combined with the alternative embodiment in FIG. 10, which houses an exhaust and/or after-treatment encapsulation within the first portion of the encapsulation. It is expected that those skilled in the art would appreciate that other constraints such as heat protection would require additional measures such as the application of aluminium foil to be applied to areas adjacent to hot sources (exhaust etc.) to ensure sufficient durability of the encapsulation.

The invention claimed is:

1. An encapsulation device suitable for encapsulating a transmission component of an engine system comprising:
a housing member configured to encapsulate the transmission component and define an air gap in a volume between an outer surface of the transmission component and an inner surface of the encapsulation device, wherein the housing member is configured to allow air flow through the air gap during operation of the engine system and to retain a heated air layer around the encapsulated transmission component following engine system shutdown, wherein the housing member comprises pressure actuated air outlet ducts.

2. An encapsulation device as claimed in claim 1, wherein the housing member comprises a first portion and a second portion configured to be fixed together to encapsulate the transmission component and define the air gap.

3. An encapsulation device as claimed in claim 2, wherein the first portion is disposed above the second portion.

4. An encapsulation device as claimed in claim 2, wherein the second portion is removably attached to the first portion.

5. An encapsulation device as claimed in claim 2, wherein the air outlet ducts are located on a bottom panel of the second portion.

6. An encapsulation device as claimed in claim 2, wherein the air outlet ducts are located on a top panel of the first portion.

7. An encapsulation device as claimed in claim 1, wherein the housing member comprises a substantially vertical panel and the air outlet ducts are located on the substantially vertical panel.

8. An encapsulation device as claimed in claim 1, wherein the housing member is configured to additionally encapsulate at least one of an exhaust component and an after-treatment component within the volume between the outer surface of the transmission component and the inner surface of the encapsulation device.

9. An encapsulation device as claimed in claim 1, wherein the housing member comprises an outer surface arranged to support an exhaust encapsulation housing for encapsulating at least one of an exhaust component and an after-treatment component.

10. An encapsulation device as claimed in claim 1, wherein the housing member comprises a heat reflective coating.

11. A vehicle comprising:
an engine system including a transmission component; and
an encapsulation device comprising a housing member configured to encapsulate the transmission component and define an air gap in a volume between an outer surface of the transmission component and an inner surface of the encapsulation device, wherein the housing member is configured to allow air flow through the air gap during operation of the engine system and to retain a heated air layer around the encapsulated transmission component following engine system shutdown, wherein the housing member comprises pressure actuated air outlet ducts.

* * * * *